US011258759B2

United States Patent
Goldstein

(10) Patent No.: US 11,258,759 B2
(45) Date of Patent: Feb. 22, 2022

(54) ENTITY-SEPARATED EMAIL DOMAIN AUTHENTICATION FOR KNOWN AND OPEN SIGN-UP DOMAINS

(71) Applicant: ValiMail Inc., San Francisco, CA (US)

(72) Inventor: Peter Martin Goldstein, San Francisco, CA (US)

(73) Assignee: ValiMail Inc., San Francisco, CA (US)

( * ) Notice: Subject to any disclaimer, the term of this patent is extended or adjusted under 35 U.S.C. 154(b) by 161 days.

(21) Appl. No.: 16/573,189

(22) Filed: Sep. 17, 2019

(65) Prior Publication Data
US 2020/0092257 A1 Mar. 19, 2020

Related U.S. Application Data

(60) Provisional application No. 62/732,269, filed on Sep. 17, 2018.

(51) Int. Cl.
*H04L 29/06* (2006.01)
*H04L 51/00* (2022.01)
*H04L 61/4511* (2022.01)

(52) U.S. Cl.
CPC .......... *H04L 63/0245* (2013.01); *H04L 51/12* (2013.01); *H04L 61/1511* (2013.01); *H04L 63/0236* (2013.01); *H04L 63/0823* (2013.01); *H04L 63/1483* (2013.01)

(58) Field of Classification Search
CPC . H04L 63/0245; H04L 51/12; H04L 61/1511; H04L 63/0236; H04L 63/0823; H04L 63/1483
See application file for complete search history.

(56) References Cited

U.S. PATENT DOCUMENTS

| | | | |
|---|---|---|---|
| 7,854,001 B1* | 12/2010 | Chen | H04L 63/1483 726/22 |
| 2004/0073617 A1 | 4/2004 | Milliken et al. | |
| 2005/0091320 A1 | 4/2005 | Kirsch et al. | |
| 2007/0067395 A1 | 3/2007 | Blinn et al. | |
| 2008/0104186 A1 | 5/2008 | Wieneke et al. | |
| 2009/0300768 A1 | 12/2009 | Krishnamurthy et al. | |
| 2011/0282857 A1 | 11/2011 | Bennett | |

(Continued)

OTHER PUBLICATIONS

PCT International Search Report and Written Opinion, PCT Application No. PCT/US2019/051521, dated Dec. 3, 2019, 27 pages.

*Primary Examiner* — Yogesh Paliwal
(74) *Attorney, Agent, or Firm* — Fenwick & West LLP

(57) ABSTRACT

An email validation system receives an email validation request from a requestor to validate an email, the email validation request indicating at least a sender domain indicating a domain of the sender of the email. The email validation system determines whether the sender domain is in a whitelist of known domains, wherein a known domain is a domain that is linked to an organization whose provenance is known, such that it can be linked to an identifiable entity in the real world. The email validation system generates, in response to determining that the sender domain is not in the list of known domains, a message indicating that the email is not valid. The email validation system generates, in response to determining that the sender domain is in the list of known domains, the message indicating that the email is valid, and transmits the message to the requestor.

24 Claims, 6 Drawing Sheets

(56) References Cited

U.S. PATENT DOCUMENTS

| | | |
|---|---|---|
| 2015/0188874 A1 | 7/2015 | Feinstein |
| 2015/0213131 A1* | 7/2015 | Styler .................. G06Q 10/107 |
| | | 707/767 |
| 2015/0381654 A1* | 12/2015 | Wang ...................... H04L 67/22 |
| | | 726/23 |
| 2016/0065611 A1 | 3/2016 | Fakeri-Tabrizi et al. |
| 2016/0255049 A1* | 9/2016 | Windsor .................. H04L 51/12 |
| | | 726/12 |
| 2016/0315969 A1* | 10/2016 | Goldstein ................ H04L 63/08 |
| 2017/0041333 A1 | 2/2017 | Mahjoub et al. |
| 2017/0339193 A1 | 11/2017 | Goldstein |
| 2018/0255083 A1* | 9/2018 | Rao ..................... H04L 63/1425 |
| 2019/0036930 A1* | 1/2019 | Bartik .................... G06F 21/577 |

* cited by examiner

ENTITY-SEPARATED EMAIL DOMAIN AUTHENTICATION FOR KNOWN AND OPEN SIGN-UP DOMAINS

CROSS REFERENCE TO RELATED APPLICATION

This application claims the benefit of U.S. Provisional Application No. 62/732,269, filed Sep. 17, 2018, which is incorporated by reference in its entirety.

FIELD OF ART

The disclosure generally relates to the field of electronic messaging, and specifically to entity-separated email domain authentication for known and open sign-up domains.

BACKGROUND

While services such as Domain-based Message Authentication, Reporting and Conformance (DMARC) and Sender Policy Framework (SPF) can be used to validate emails to prevent email spoofing, i.e., the sending of emails using forged email addresses, these services do not prevent the receipt of emails which are from fraudulent domains masquerading as legitimate ones. For example, a malicious user may register the domain "acmee.com" and send emails from that domain, without email spoofing, to unsuspecting users who may accidentally understand the domain to be from the legitimate domain of "acme.com." Some secure email gateways may send emails to a central system for checking email domains against simple blacklists or whitelists. However, such an approach may generate many false positives and negatives, while also creating a security vulnerability by transmitting emails, which may contain sensitive information, to a central repository. Such systems may also not be able to deal properly with emails from open sign up domains (e.g., free email services).

Hence, what is lacking, inter alia, is an ability to transparently and securely police email domains in a receiving email system.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Exemplary System for Email Validation

Figure 1:
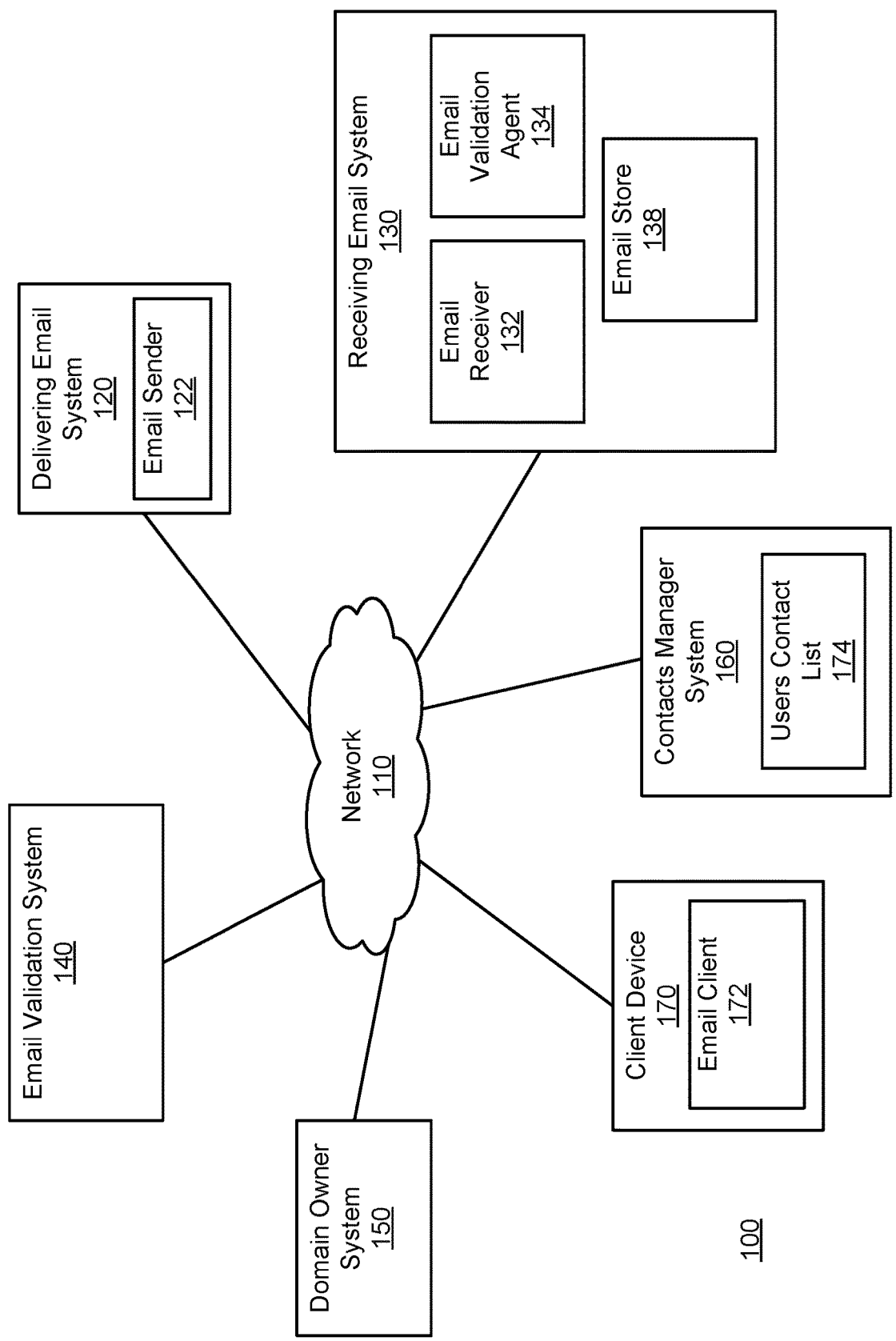
FIG. 1 illustrates an exemplary system for validating email domains, according to an embodiment.

FIG. 1 illustrates an exemplary system for validating email domains, according to an embodiment. The system 100 includes a network 110, a delivering email system 120, a receiving email system 130, an email validation system 140, a domain owner system 150, one or more client device 170, and a contacts manager system 160. Although the illustrated system 100 includes the elements shown in FIG. 1, in other embodiments the system 100 may include different elements or a different number of elements. For example, there may be multiple receiving email systems 130 or other elements. Furthermore, the functionalities of each element may be distributed differently among the elements in other embodiments.

Network

The network 110, which can be wired, wireless, or a combination thereof, enables communications among at least the elements shown, and may include the Internet, a LAN, VLAN (e.g., with VPN), WAN, or other network. For example, some of the elements, such as the client device 170 and receiving email system 130 may communicate with each other using a LAN, making at least some of the communications between these entities hidden to the external WAN or Internet with which the other elements, such as the delivering email system 120, are connected. In one embodiment, the network 110 uses standard communications technologies and/or protocols, such as Hypertext Transfer Protocol (HTTP), Transmission Control Protocol/Internet Protocol (TCP/IP), Uniform Resource Locators (URLs), and the Doman Name System (DNS). In another embodiment, the entities can use custom and/or dedicated data communications technologies instead of, or in addition to, the ones described above.

Client Device

The client device 170 receives emails for a user from the receiving email system 130 for presentation to the user. The client device 170 may comprise a computing system such as the computing system described with reference to FIG. 6.

The client device 170 includes an email client 172 to interface with the receiving email system 130. The email client 172 may be a web browser, client application, or other interface which communicates with the receiving email system 130 to allow a user of the client device 170 to access the user's email account. This access includes the ability to send and receive emails, and to enter contacts into a contact list. In the case where the email client 172 is a web browser, the receiving email system 130 may provide a web interface to allow the web browser to access the user's email account via the web interface. The actual emails, contacts information, and other data may be stored at the client device, such as in a cache, etc., or externally, e.g., at the receiving email system 130. In one embodiment, if a received email is not properly validated by the receiving email system 130, the email client 172 may not be able to access the email. In other embodiments, the email client 172 may be able to access the email but also receive an indication (e.g., an alert) that the email is suspected to be fraudulent or suspicious. Such an email may be accessible by the email client 172 in a separate section of the interface provided by the receiving email system 130, such as in a spam folder.

Contacts Manager System

The contacts manager system 160 comprises one or more network attached systems that store email addresses for known contacts of users with accounts at the receiving email system 130. user contact. The contacts manager system 160 may be part of the receiving email system 130, may be a component in a cloud-based system executing on one or more computing devices of cloud infrastructure provider, or may be a standalone computing device or set of computing devices, similar to the computing devices described with reference to FIG. 6. The email addresses stored in the contacts manager system 160 are stored in the user contact list 174. The email addresses stored in the contacts manager system 160 may derive from several sources. Some may come from lists of contacts with email addresses, generated and maintained by the individual users of the receiving mail system. Users may update contact lists on a number of systems. In some implementations this may include a web-based interface or an installed email client, such as email client 172. Each contact in the user contact list 174 can be associated with the user who entered the contact. Contacts may be added to the list on a per-group, domain or system wide basis by an administrator. As described in further detail below, the email addresses in the user contact list 174 may be used by the receiving email system 130 to validate emails which have sender addresses matching email addresses in this user contact list 174.

Delivering Email System

The delivering email system 120 delivers or sends emails for or on behalf of a domain owner, such as the domain owner system 150. In some embodiments, the delivering email system 120 includes one or more systems that may be configured similarly to the computing system described with reference to FIG. 6. As an example, the delivering email system 120 may be a mailing list server, a bulk email provider that sends emails on behalf of a domain, a transactional email system managed by a third party that sends emails on behalf of a domain, or a security system that scans emails on behalf of a domain. The delivering email system 120 may send email on behalf of the domain owner and may also provide additional processing or functionality for the sent emails. Alternatively, the delivering email system 120 may be part of the domain owner, e.g., the delivering email system 120 is a sub-system within the domain owner's system.

The delivering email system 120 includes an email sender 122 to process and send emails. In one example embodiment, the email sender 122 uses standard mail protocols, such as Simple Mail Transfer Protocol (SMTP) in order to deliver emails. These emails may be delivered to other domains, such as the one associated with the receiving email system 130.

Receiving Email System

The receiving email system 130 receives emails bound for a domain associated with the receiving email system 130. For example, the receiving email system 130 may receive emails from the delivering email system 120. In one embodiment, the receiving email system 130 comprises one or more computing systems, which may be configured similarly to the computing system described with reference to FIG. 6. In another embodiment, the receiving email system may be a component of a cloud-based system and may execute on one or more computing systems of a cloud infrastructure provider.

The receiving email system 120 includes an email receiver 132 to receive emails, and an email validation agent 134 to validate the received emails in conjunction with the email validation system 140. In one embodiment, the email receiver 122 uses standard mail protocols, such as Simple Mail Transfer Protocol (SMTP), to receive emails bound for addresses associated with a domain for which the receiving email system 130 is associated. For example, this domain could be a domain stored in an MX record on a DNS system of an organization associated with the receiving email system 130. Any emails which are addressed to this domain may be transmitted to the receiving email system 130, and in response the email receiver 132 may process these emails. The email receiver 132, after receiving these emails, may transmit them to the email validation agent 134 for validation, or may in some cases, directly process these emails and send them to an email storage location of a user associated with the recipient email address of the email (i.e., the address indicated in a "To" section of the email).

The email validation agent 134 validates emails by, in some cases, determining whether an email that claims to have come from a domain was actually sent from that domain or authorized by that domain (e.g., the domain owner). For example, if an email purports to come from the domain "acme.com," the email authenticator 134 determines whether the "acme.com" domain actually sent the email, or whether an owner of the "acme.com" domain authorized the sender of the email to send on behalf of the "acme.com" domain. Thus, the email authenticator 134 operates to prevent email spoofing. The domain of a received email may be specified in the envelope or header of the email, such as in the Return-path address, or in a From section, etc. of the email. To validate a received email, the email authenticator 134 may submit one or more pieces of validation information for the email to the email validation system 140. This validation information may include an identifier of the sender address or domain, the receiver address or domain (i.e., the address the email is being sent to). The sender address may be hashed or otherwise obfuscated to protect the privacy of the sender.

The email validation agent 134 receives, after sending the validation information of the email to the email validation system 140, a response from the email validation system 140 indicating whether the email is valid, i.e., whether it is from a known domain and/or sender. A known domain is a domain that is owned or represented by the organization (or entity) for which the domain purports to be. If the email is valid, the email validation agent 134 may store the email for later access, e.g., at the email store 138. The stored email is associated with the account of the user that matches the recipient(s) indicated in the email. Instead, if the email is not valid, then the email validation agent 134 may send a notification to an administrator, quarantine the email, or perform some other remediation action against the email.

The email validation agent 134 may perform other actions, such as receiving the user contact list 174 associated with the receiving email system 130. The email validation agent 134 hashes the email addresses in these authorized contacts lists 174, and transmits the hashed email addresses to the email validation system 140. These hashed email addresses may further be used to validate emails that are sent from these addresses. In one embodiment, the email validation agent 134 may be a separate software package executing on the receiving email system 130. In another embodiment, the email validation agent 134 may be a plugin tool executing at the receiving email system 130.

Additional details regarding the email validation agent 134 are described below with reference to FIG. 2.

Email Validation System

The email validation system 140 validates emails for which validation information is sent by the email validation agent 134 of the receiving email system 130. Upon receiving validation information for an email from the email validation agent 134, the email validation system 140 may inspect the sender domain indicated in the validation information. The email validation system 140 compares this information to a database of known domains. These are list of trusted domains which are known to be authentic and not spoofed or otherwise malicious. If the sender domain matches a domain in this list of known domains, the email validation system 140 may indicate to the email validation agent 134 that the email is valid.

The email validation system 140 additionally determines if the sender domain is an open-sign up domain. An open sign-up domain is a domain for which any user may request an email address (for no cost or for a fee). Services which operate open sign-up domains, in contrast to organizations such as corporations or other associations, do not control which users may use their services. Therefore, emails with sender domains matching an open sign-up domain may be from any sender, legitimate or otherwise. The email validation system 140 determines whether an email with a sender from an open sign-up domain is valid using a database of trusted contacts. These trusted contacts may be derived from the user contact list 174 of associated with the receiving mail system 130. If an email with sender domain that is an open sign-up domain has a sender address which matches an address in the trusted contacts database, the email validation system 140 may also indicate to the email validation agent 134 that the email is valid.

The email validation system 140 may in some cases determine that the email has a sender address that is neither in a database of known domains or in a list of trusted contacts. In such a case, the email validation system 140 may perform a new domain inspection upon the new domain. This inspection is used to determine whether the new domain should be placed in the database of known domains as a known domain.

The email validation system 140 may also log all requests for email validation, and transmit portions of this log to an administrator of the receiving email system 130 for further analysis and processing. In one embodiment, the email validation system 140 is a component of the receiving email system 130. In another embodiment, the email validation system 140 is a component of a third party email validation entity. Additional information regarding the email validation system 140 is described below with reference to FIG. 3.

Domain Owner System

The domain owner system 150 comprises one or more computing systems, which may be configured similarly to the computing system described with reference to FIG. 6, and which may be associated with a domain owner of a sender domain for which the delivering email system 120 sends emails.

The domain owner system 150 may include a DNS server on which an authoritative domain name system (DNS) record of a domain owner is stored. The domain owner may be associated with the purported domain of emails that have been sent to the receiving email system 130. The domain owner DNS system 150 uses the DNS protocol to respond to DNS requests for DNS records for the domain owner. Examples of these DNS records include A records, CNAME records, MX records, TXT records, and so on.

Example Email Validation Agent

Figure 2:
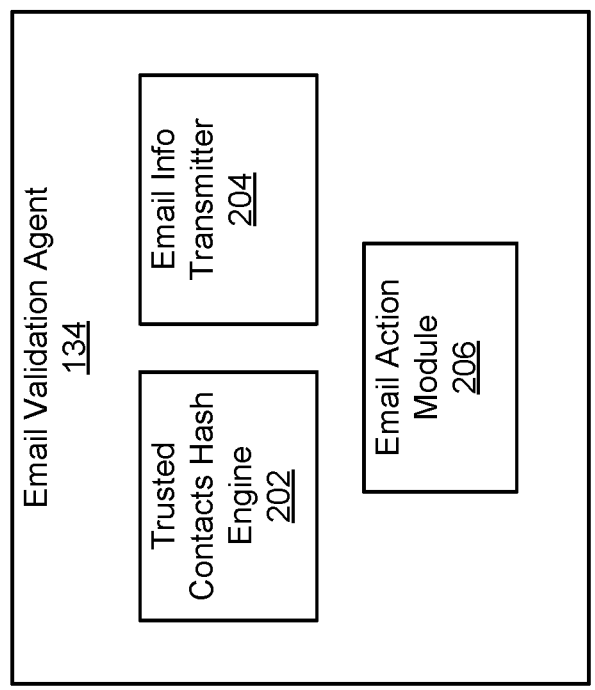
FIG. 2 is a detailed block diagram of the email validation agent of the receiving email system of FIG. 1, according to one embodiment.

FIG. 2 is a detailed block diagram of the email validation agent of the receiving email system of FIG. 1, according to one embodiment. The email validation agent 134 includes a trusted contacts hash engine 202, an email info transmitter 204, and an email action module 206. Although the illustrated email validation agent 134 includes the elements shown in FIG. 2, in other embodiments the email validation agent 134 may include different elements or a different number of elements. Furthermore, the functionalities of each element may be distributed differently among the elements in other embodiments.

Trusted Contacts Hash Engine

The trusted contacts hash engine 202 receives or accesses, from the contacts manager system 160, the user contact lists 174 of each domain associated with an organization and hashes the email addresses contained in the list(s) for transmission to the email validation system 140. In one embodiment, the trusted contacts hash engine 202 takes each email address in a user contact list 174 and hashes the email address. However, in another embodiment, the trusted contacts hash engine 202 only hashes email addresses associated with a list of authorized users of the organization. The hash is transmitted by the trusted contacts hash engine 202 to the email validation system 140. The hash may be a hash of the local part of the email address, of the domain of the email address, a combination of the two, or may be more than one hash for each of the local part and domain. The hash can be transmitted along with an indicator of the organization, as well as an indicator of the email address of the user which is associated with the contact that was used to generate the hash. The email of the user may also be hashed by the trusted contacts hash engine 202 before transmitting it to the email validation system 140. The trusted contacts hash engine 202 may further hash the email address in combination with a key. Such a key is only known to the email validation agent 134, and is stored locally and not transmitted over a network. The key may be a randomized string of hashable characters. The hash itself prevents the transmission of personally identifiable information to an external entity, such as the email validation system 140. The addition of the key in the hash further prevents the external entity from tracking the hashed email address over multiple systems, in the case where the external entity receives hashes of the same email address using the same hashing algorithm from these multiple systems. This also allows the email validation agent 134 to comply with various privacy regulations, such as the GDPR (General Data Protection Regulation) of the European Union.

The hashing algorithm that is used may be HMAC. HMAC uses a hash function, such as SHA256 or MD5, and a cryptographic key, such as the key described above, in order to hash a message, such as the email address. In addition, different cryptographic keys may be used to hash email addresses, in accordance with the user or subgroup of users to which the email addresses are associated. Therefore, there may be multiple cryptographic keys in use for signed hashes at any given time.

The trusted contacts hash engine 202 may further normalize the email address before hashing it. In one embodiment, if the domain of the email address has many variations, the trusted contacts hash engine 202 replaces the domain of the email address with a standard default variation if the domain does not match the standard default variation. For example, if the email address has a domain listed as googlemail.com, the trusted contacts hash engine 202 may convert this to gmail.com.

Although a process is described above whereby the email addresses are hashed, in other embodiments no hashing is performed on the email addresses and the email addresses are transmitted without modification (e.g., without hashing or obfuscation).

Email Info Transmitter

The email info transmitter 204 transmits validation information about an email to the email validation system 140 in an email validation request. This may occur every time a new email is received by the receiving email system 130, or may occur in batch. As described above, the validation information may include various metadata about the email that is received. This may include the sender domain of the sender address of the email (i.e., the domain indicated in the From header section of the email), the Return-path of the email, the recipient domain of the email (i.e., the domain indicated in the To header section of the email), the sender local part address of the sender address (i.e., the portion of the sender address before the @ symbol in the From header section of the email), the recipient local part address, the EHLO information of the email, any IP address indicated in the header of the email, and so on. Any of the metadata may first be hashed by the email info transmitter 204 before being transmitted to the email validation system 140. This may include hashing (portions of) the sender and/or recipient address of the email using the same hashing algorithm and key used by the trusted contacts hash engine 202. The email info transmitter 204 may also normalize the sender address before hashing it or transmitting it to the email validation system 140. This normalization may include changing alternate domain names to a standard domain name according to one or more rules. For example, the domain "googlemail.com" may be converted to "gmail.com".

Email Action Module

As described above, after sending the validation information of a received email to the email validation system 140, the email validation system 140 responds with an indication of whether the email is valid or not valid. The email action module 206 acts in response to this information. If the email is indicated to be a valid email, the email action module 206 may forward the email to the email store 138 and associate it with the user indicated in the recipient address of the email, i.e., the email is processed normally, so that the user may later access it via the email client 172. If the email is indicated to be not valid, the email action module 206 may perform various remediation actions based on a policy or the content of the email. In one embodiment, the email action module 206 may quarantine the email. In another embodiment, the email action module 206 may forward the email to the user but include with the email a warning or other indicator to alert the user that the email may be fraudulent. The email action module 206 may transmit a notification to an administrator, who can further take action upon the email, such as mark the sender domain of the email as a trusted domain for that organization. If marked as a trusted domain, the sender domain may be added to a custom domain list for the organization at the email validation system 140. The action performed by the email action module 206 may be specific for each user, e.g., some users may receive emails that are not valid (e.g., a sales representative), while others may not. In another embodiment, the email action module 206 may simply delete the email and do nothing else. The email action module 206 may also process the email normally without any special action. In some embodiments the email action module 206 may incorporate email authentication results (i.e. DMARC, SPF, DKIM) or other forensic data as inputs into the policy decision for disposition of the email.

Example Email Validation System

Figure 3:
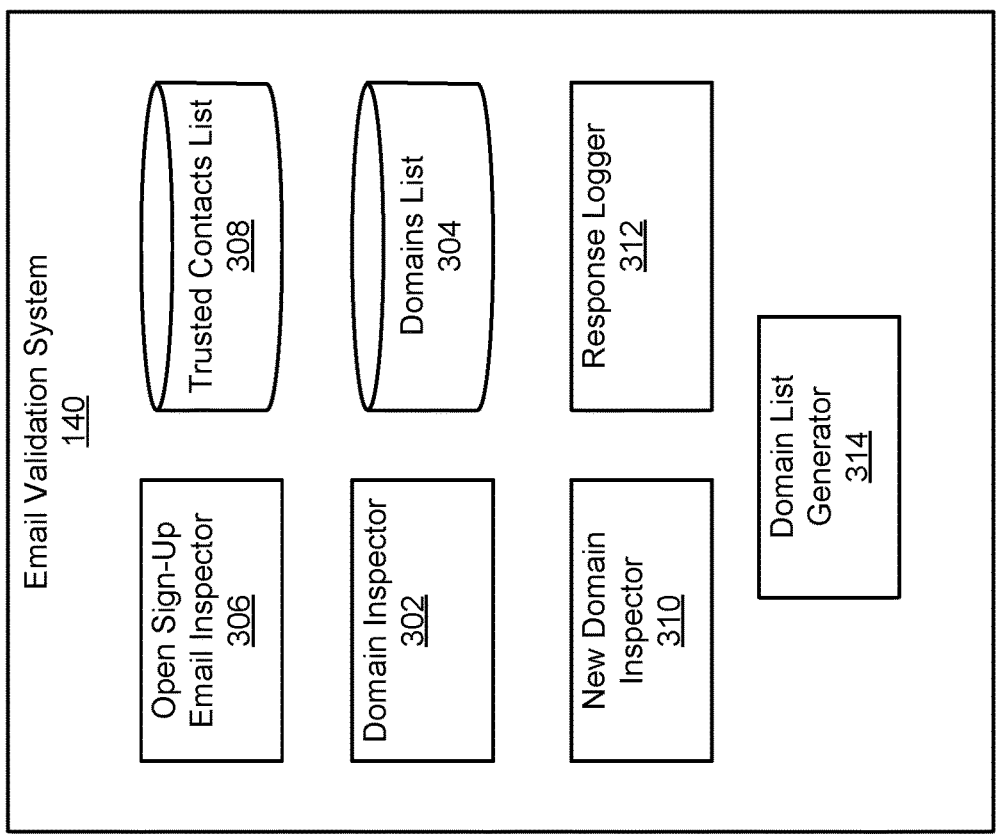
FIG. 3 is a detailed block diagram of the email validation system of FIG. 1, according to one embodiment.

FIG. 3 is a detailed block diagram of the email validation system 140 of FIG. 1, according to one embodiment. The email validation system 140 includes a domain inspector 302, a domains list 304, an open sign-up email inspector 306, a trusted contacts list 308, a new domain inspector 310, a response logger 312, and a domain list generator 314. Although the illustrated email validation system 140 includes the elements shown in FIG. 3, in other embodiments the email validation system 140 may include different elements or a different number of elements. Furthermore, the functionalities of each element may be distributed differently among the elements in other embodiments.

Trusted Contacts List

The trusted contacts list 308 includes sender email addresses received from the trusted contacts hash engine 202 of the email validation agent 134 for various domains/organizations. These sender email addresses are known contacts from which emails can be received, as they were added by the users of the organization. Each email address in the trusted contacts list 308 may be represented by a hash, such that the email validation system 140 cannot identify a person associated with the email address. Each email address in the trusted contacts list 308 may be associated with an indicator of the organization from which the email address was received, and may also be associated with an indicator of the user from which email address was received. The indicator of the user may be a hash of the recipient email address of the user. As noted, the email addresses in the trusted contacts list 308 are received from the trusted contacts hash engine 202 of the various email validation agents 134 of various organizations which utilize the email validation system 140. Upon receiving the hashed email addresses from the email validation agents 134, the email validation system 140 may perform various sanity and validation checks upon the hashed email addresses, and store the hashed email addresses in the trusted contacts list 308. For example, the email validation system 140 may verify that the hash is a valid hash. As noted above, in some cases the emails are not hashed. In such a case, the email validation system 140 does not verify the hash as the email addresses are not hashed.

Open Sign-Up Email Inspector

The open sign-up email inspector 306 responds to email validation requests from the email validation agent 134 for emails in which the sender domain is an open sign-up domain to determine if the sender address is valid. The open sign-up email inspector 306 matches the sender domain in the validation information of an email validation request to determine whether the sender domain matches an open sign-up domain indicated in the domains list 304. If so, the open sign-up email inspector 306 determines whether the sender address indicated in the email validation request matches an address in the trusted contacts list 308. As described above, the sender address in the validation information may be hashed using a hashing algorithm and a key. The same hashing algorithm and key would have been used to hash the email addresses stored in the trusted contacts list 308. Therefore, a match between the hashed sender address in the validation information and a hashed email address in the trusted contacts list 308 indicates that the email is from a known contact. The open sign-up email inspector 306 matches the hashed sender address in the validation information with the hashed email addresses in the trusted contacts list 308 to determine if a match exists. If a match is found, the open sign-up email inspector 306 may transmit a response to the email validation agent 134 that the email associated with the email validation request is a valid email. Otherwise, if a match is not found, the open sign-up email inspector may transmit a request to the domain inspector 302 to inspect the sender domain, or may transmit a response to the email validation agent 134 indicating that the email is not valid.

The open sign-up email inspector 306 may only check the email contacts in the trusted contacts list 308 which are associated with the organization which requested the email validation request. The open sign-up email inspector 306 may further limit the email contacts that are checked in the trusted contacts list 308 to email addresses which are associated with the recipient address indicated in the validation information.

Domains List

The domains list 304 includes a list of known domains. These known domains are domains known to be associated with domain owners that are linked with known organizations. A known organization is one whose provenance is known, such that it can be linked to an identifiable entity in the real world. For example, the domain valimail.com is a known domain because it can be associated with a known organization, i.e., Valimail, Inc. of San Francisco, Calif. Therefore, the list of known domains in the domains list 304 are all domains for which a definite association with a real world entity has been established. While the known domains have links to real world entities, this does not mean that the real world entities are necessarily always good actors. A real world entity may perform activities which are in violation of various laws or other regulations. However, the linking of the domain to the real world organization better guarantees that a chain of liability or indemnity may be traced from emails sent by the known domain to the real world organization. In one embodiment, the domains list 304 is stored in punycode format.

The domains list 304 may also include a list of open sign-up domains. As described above, an open sign-up domain is a domain which allows any user to sign up for an email address (either for free or for a fee). Examples of open sign-up domains include gmail.com, yandex.ru, outlook.com, and so on.

In one embodiment, the domains list 304 also includes a list of bad domains, e.g., spoofing, phishing, or other malicious domains. These are domains that have previously been determined to be bad domains, i.e., domains which are not associated with a known and legitimate organization.

In another embodiment, the domains list 304 also includes a list of custom domains. The custom domains list is a list of known domains, and in some cases bad domains, specific to an organization. In other words, these domains have been selected by the organization and are only checked when the recipient domain indicated in the email validation request is associated with the organization. Each organization may have its own list of custom domains.

Domain Inspector

The domain inspector 302 compares the sender domain information received in an email validation request from the email validation agent 134 to a list of known domains in the domains list 304. If a match is found, then the domain inspector 302 may transmit a response to the email validation agent 134 indicating that the email is valid. If no match is found, then the domain inspector 302 may transmit a response to the email validation agent 134 indicating that the email associated with the email validation request is not valid, or may further send the email validation request to the new domain inspector 310 to determine whether the domain is valid.

In one embodiment, before checking the sender domain, the domain inspector 302 also checks to see if the recipient domain received in the email validation request is within a list of recipient domains (e.g., that are subscribed to the email validation service). If not, the domain inspector 302 may stop checking for the sender domain and return an error. In another embodiment, before checking the sender domain, the domain inspector 302 may normalize the sender domain. This may include converting the domain to a standard domain name for the organization associated with the sender domain using a list of known alternative domain names.

In some cases, the domain inspector 302 may also check the sender domain to see if it matches a bad domain that is stored in the domains list 304. If such a match is found, the domain inspector 302 transmits a response to the email validation agent 134 indicating that the sender domain matches a known bad domain.

In one embodiment, the domain inspector 302 also matches the sender domain with a known domain (or bad domain) in a list of custom domains for the organization, in a fashion similar to the process described above of matching the sender domain to the list of known domains. This custom domains is stored in the domains list 304.

New Domain Inspector

The new domain inspector 310 may inspect sender domains received in email validation requests that are not listed in the domains list 304 to determine whether they belong to known organizations. If a sender domain from an email validation request is not indicated in the domains list 304, then the new domain inspector 310 may execute various processes to determine whether this new domain is associated with a known organization.

In one embodiment, the new domain inspector 310 checks the WHOIS information of the new domain. If the WHOIS information includes address or other contact information which can be traced to a real world location, e.g., via an address database, a mapping tool, a public contacts database, a government incorporation database, then the new domain inspector 310 may determine that the new domain is associated with a known organization, and may store this new domain as a known domain in the domains list 304. The new domain inspector 310 may also inspect the historical information for the new domain, to determine how long the WHOIS information has been registered, and whether it has changed. If the WHOIS information has been registered for a threshold duration without change, the new domain inspector 310 may also include the new domain as a known domain in the domains list 304.

The new domain inspector 310 may query a passive DNS database for the new domain. The passive DNS database captures various DNS requests made across the Internet. The new domain inspector 310 may store the new domain as a known domain if the passive DNS database indicates that the new domain has been requested by other known domains for a threshold duration of time into the past (i.e., whether one or more timestamps of queries from other known domains is beyond a time duration threshold from the current time) or by a threshold number of other known domains.

The new domain inspector 310 may inspect any website or other Internet presence (e.g., a mail server, DNS server, file server, etc.) associated with the new domain (e.g., by using the DNS records of the new domain). The existence of multiple presences (e.g., beyond a threshold count) may cause the new domain inspector 310 to store the new domain as a known domain. The new domain inspector 310 may compare these presences to the presences of known domains (e.g., it may compare the website of the new domain to those websites of known domains). If one or more presences of the new domain closely matches (e.g., via image analysis, metadata comparison) the corresponding presence of a known domain (e.g., by a threshold similarity percentage), the new domain inspector 310 may not store the new domain as a known domain (and may store it as an invalid/bad domain in the domains list 304).

The new domain inspector 310 may include a machine learning classifier to classify new domains. The classifier may receive as features the data indicated above for a domain, and return a confidence score indicating whether that domain is likely a known domain. The classifier may be trained on valid and invalid domains.

The new domain inspector 310 may, after making a determination that a new domain is a known domain, send the determination result to an administrator, which may further verify the results of the determination, before transmitting a request to the new domain inspector 310 to have the new domain inspector 310 store the new domain as a known domain. Conversely if the new domain inspector 310 does not determine that the new domain is a known domain, the new domain inspector 310 may also send this determination to the administrator, who may override the determination made by the new domain inspector 310. However, in another embodiment, the new domain inspector 310 places the domain into the known domain list or the bad domain list without sending it for confirmation to the administrator when it determines that the domain is a known domain or is not a known domain, respectively.

The new domain inspector 310 may also submit a request to an administrator of the organization associated with the receiving email system 130 which made the email validation request in order to determine whether the new domain is a known domain. If the administrator responds with an indication that the domain is known, the new domain inspector 310 may store this new domain as a custom domain for that organization only. If a sufficient number of administrators indicate that a new domain is a known domain, then that new domain may also be placed in the global known domains list.

Response Logger

The response logger 312 logs email validation requests and the response provided by the email validation system 140 in response to these requests. These logs may be transmitted by the response logger 310 to an administrator of the receiving email system 130, etc.

Domain List Generator

The domain list generator 314 may generate the initial list of known domains in the domains list 304. To generate the initial list, the domains list generator 314 may monitor the inbound emails for a selected number of organizations to gather a list of domains indicated in those received emails. These domains may be analyzed to determine which of them are legitimate, and these legitimate domains are placed in the list of known domains, while the illegitimate domains may be placed in the list of bad domains. Alternatively, the domains for the list of known domains may be determined automatically, by selecting those domains indicated in emails that users in the selected number of organizations respond to beyond a threshold number of replies, which users across multiple organizations respond to, and so on. The new domain inspector 310 may remove from these lists those emails which have sender domains that belong to open sign-up domains. The domain list generator 314 may also gather lists of known domains from third party sources, such as third party organizations that collect domains for known organizations, semi-private data sources (e.g., list from a marketing organization), private data sources, and public data sources (e.g., a list of publicly traded companies such as the Fortune 500 or Russell 1000). The domain list generator may also cross-reference these lists with other known sources to generate a final list.

In one embodiment, the email validation system 140 may also receive requests from administrators of receiving email domains to remove a domain from the list of known domains for an organization. In such a case, the domains list 304 may include in the custom domains list for the organization a list of removed domains. If a domain is in this removed domains list, then it is not treated as a known domain for that organization. If a sufficient number of administrators from different organizations request that a domain be removed, that domain may also be removed from the global known domains list.

Example Interaction Diagram for Validating Email

Figure 4:
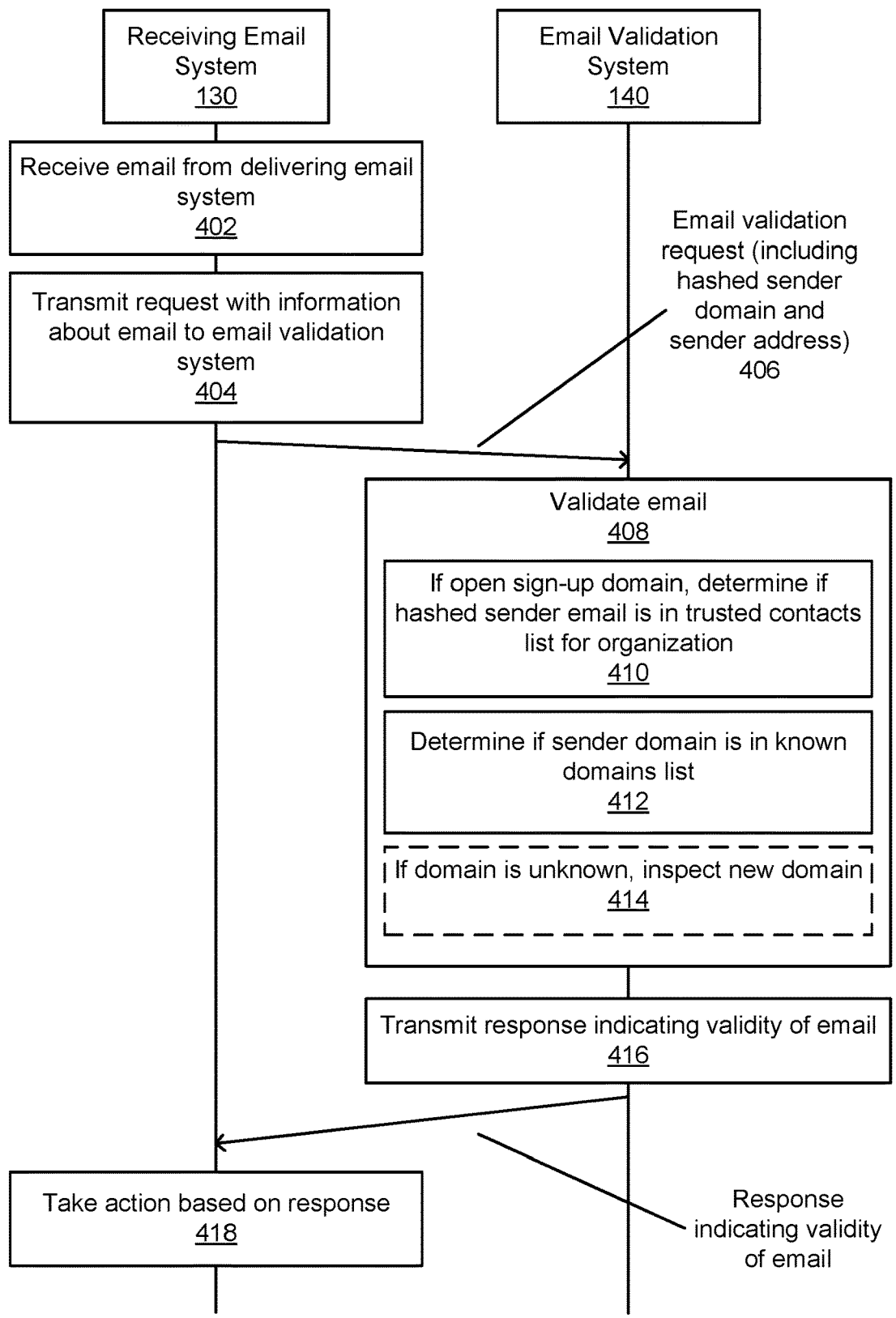
FIG. 4 is an interaction diagram illustrating an exemplary process for validating an email domain, according to one embodiment.

FIG. 4 is an interaction diagram illustrating an exemplary process for validating an email domain, according to one embodiment. In one embodiment, FIG. 4 attributes the operations in process to the indicated elements. However, some or all of the steps may be performed by other elements. In addition, some embodiments may perform the operations in parallel, perform the operations in different orders, or perform different operations. Also, it is noted that in one example embodiment the steps and/or modules may be embodied as instructions, e.g., instructions 624, that may be executed by the processor 602 described with respect to FIG. 6. Note that elements with dashed lines indicate optional elements that may not be performed or transmitted or which are performed or transmitted conditionally.

The receiving email system 130, in one embodiment, receives 402 emails from a delivering email system, such as the delivering email system 120. To validate this email, the receiving email system 130 transmits 404 an email validation request with information about the email to the email validation system 140. As noted above, this information may include the sender address, recipient address, recipient organization, and so on. One or more elements of this information may be hashed. This request may generated and sent by an email validation agent, such as email validation agent 134, on the receiving email system 130.

The email validation system 140 receives the email validation request 406, and validates the email 408. This may be performed similarly to the method described above for the email validation system 140. Thus, the email validation system 140 may determine 410 if the hashed sender email in the email validation request is in a trusted contacts list, e.g., trusted contacts list 308. The email validation system 140 may determine 412 if the sender domain indicated in the email validation request is in a known domains list, such as the known domains listed stored in the domains list 304. Otherwise, if the sender domain is unknown, the email validation system 140 may inspect 414 the new domain, and may place it in the known domains list if it determines that the domain is known.

After validating the email, the email validation system 140 transmits 416 a response to the receiving email system 130 indicating the validity of the email indicated in the email validation request 406. The receiving email system 130 may take 410 some action depending upon the response, as described above.

Example Flow Chart for Email Verification Rule Resolution

Figure 5:
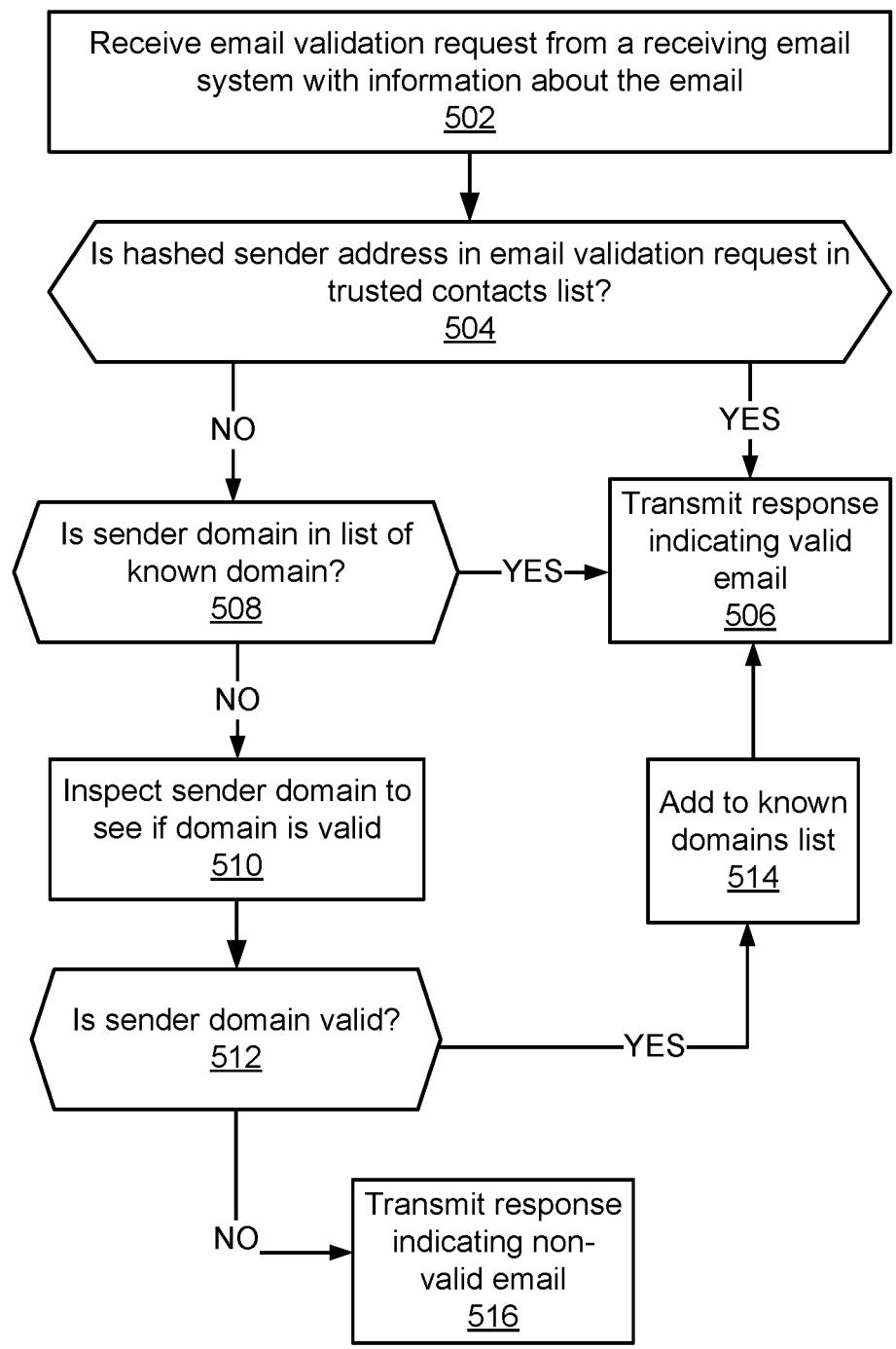
FIG. 5 is a flow chart illustrating an exemplary process for validating an email domain, according to one embodiment.

FIG. 5 is a flow chart illustrating an exemplary process for validating an email domain, according to one embodiment. In one embodiment, FIG. 5 attributes the operations in process to the email validation system 140. However, some or all of the steps may be performed by other elements. In addition, some embodiments may perform the operations in parallel, perform the operations in different orders, or perform different operations. Also, it is noted that in one example embodiment the steps and/or modules may be embodied as instructions, e.g., instructions 624, that may be executed by the processor 602 described with respect to FIG. 6. Note that elements with dashed lines indicate optional elements that may not be performed or transmitted or which are performed or transmitted conditionally.

To validate an email, the email validation system 140 receives 504 an email validation request from a receiving email system (e.g., receiving email system 130) with information about an email that was received. This information may include the sender domain, recipient domain, and hash of the sender address, as described above. The email validation system 140 determines 504 whether the hash of the sender address is in a trusted contacts list for the organization, e.g., trusted contacts list 308, in a method similar to that described above for the open sign-up email inspector 306. This inspection may also include determining if the sender domain is an open sign-up domain. If so, the email validation system 140 transmits 506 a response to the receiving email system 130 indicating that the email is valid. Otherwise, the email validation system 140 determines 508 whether the sender domain is in a list of known domains, such as the list of known domains in the domains list 304. This process may be similar to the process described above for the domain inspector 302. If the sender is a known domain, the email validation system 140 transmits 506 the response indicating the email is valid.

If the sender domain is not in the list of known domains, the email validation system 140 inspects 510 the sender domain to determine if it is valid. This inspection may be performed in a method similar to the method described above for the new domain inspector 310. If the sender domain is determined 512 to be valid, the sender domain is added 514 to the known domains list, and the valid email response is transmitted 506. Otherwise, a non-valid email response is transmitted 516.

Example Machine Architecture

Figure 6:
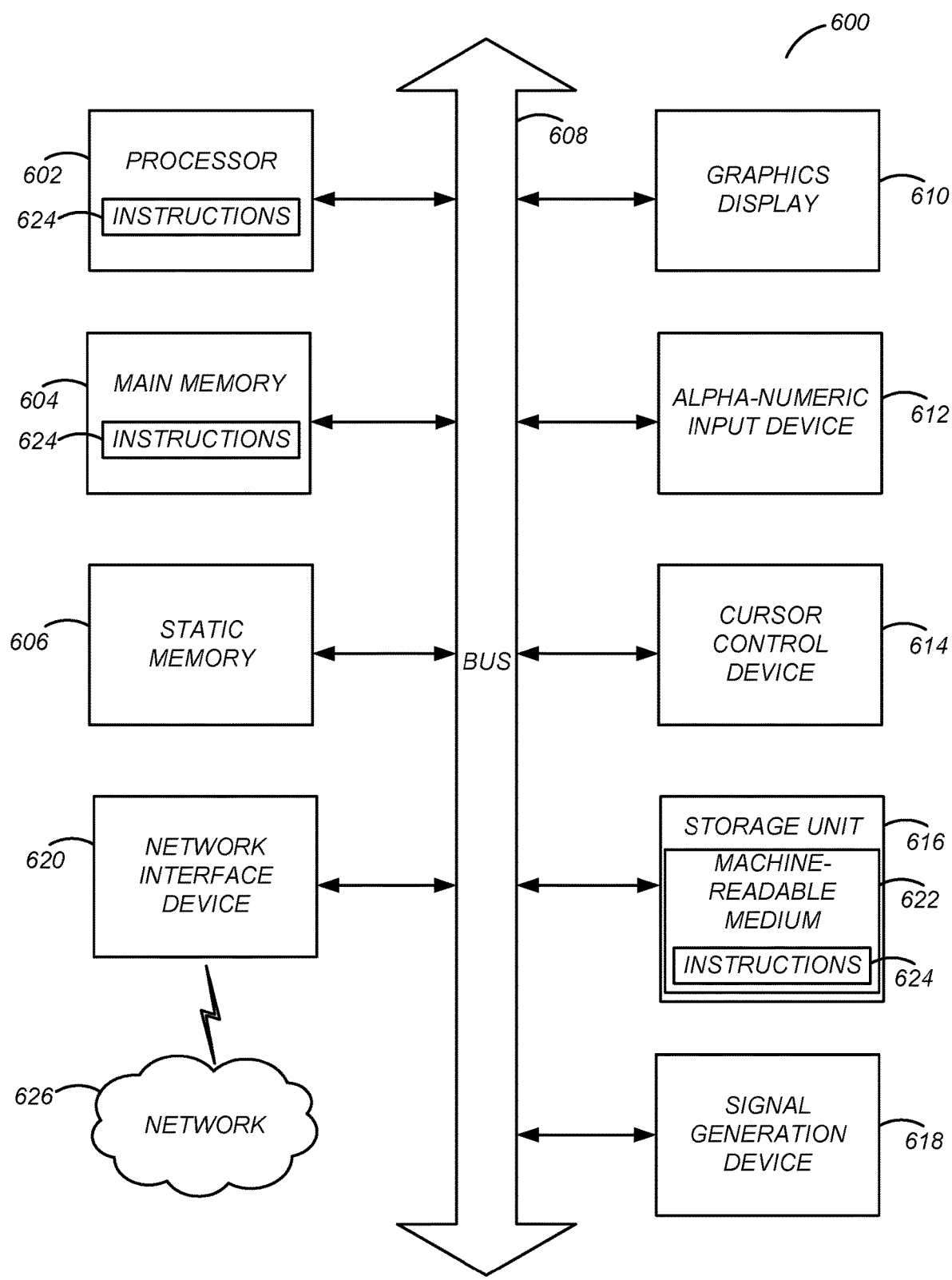
FIG. 6 is a block diagram illustrating components of an example machine able to read instructions from a machine-readable medium and execute them in a processor (or controller).

FIG. 6 is a block diagram illustrating components of an example machine able to read instructions from a machine-readable medium and execute them in a processor (or controller). Specifically, FIG. 6 shows a diagrammatic representation of a machine in the example form of a computer system 600. The computer system 600 can be used to execute instructions 624 (e.g., program code or software) for causing the machine to perform any one or more of the methodologies (or processes) or functions described herein, for example, in FIGS. 1-5. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 624 (sequential or otherwise) that specify actions to be taken by that machine. Further, while only a single machine is illustrated, the term "machine" shall also be taken to include any collection of machines that individually or jointly execute instructions 624 to perform any one or more of the methodologies discussed herein.

The example computer system 600 includes one or more processing units (generally processor 602). The processor 602 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 600 also includes a main memory 604. The computer system may include a storage unit 616. The processor 602, memory 604 and the storage unit 616 communicate via a bus 608.

In addition, the computer system 600 can include a static memory 606, a display driver 610 (e.g., to drive a plasma display panel (PDP), a liquid crystal display (LCD), or a projector). The computer system 600 may also include alphanumeric input device 612 (e.g., a keyboard), a cursor control device 614 (e.g., a mouse, a trackball, a joystick, a motion sensor, or other pointing instrument), a signal generation device 618 (e.g., a speaker), and a network interface device 620, which also are configured to communicate via the bus 608.

The storage unit 616 includes a machine-readable medium 622 on which is stored instructions 624 (e.g., software) embodying any one or more of the methodologies or functions described herein. The instructions 624 may also reside, completely or at least partially, within the main memory 604 or within the processor 602 (e.g., within a processor's cache memory) during execution thereof by the computer system 600, the main memory 604 and the processor 602 also constituting machine-readable media. The instructions 624 may be transmitted or received over a network 626 via the network interface device 620.

While machine-readable medium 622 is shown in an example embodiment to be a single medium, the term "machine-readable medium" should be taken to include a single medium or multiple media (e.g., a centralized or distributed database, or associated caches and servers) able to store the instructions 624. The term "machine-readable medium" shall also be taken to include any medium that is capable of storing instructions 624 for execution by the machine and that cause the machine to perform any one or more of the methodologies disclosed herein. The term "machine-readable medium" includes, but not be limited to, data repositories in the form of solid-state memories, optical media, and magnetic media.

Additional Considerations

Example benefits (or advantages) of the disclosed configurations include the ability to validate emails.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIGS. 1-3. Modules may constitute either software modules (e.g., code embodied on a machine-readable medium and executable by a processor) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system to validate emails. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer implemented method, comprising:
   receiving an email validation request from a requestor to validate an email, the email validation request indicating at least a sender domain;
   determining whether the sender domain is in a whitelist of known domains, wherein a known domain is a domain that is linked to an organization whose provenance is known, such that the known domain can be linked to an identifiable entity in the real world, and wherein generating the whitelist of known domains comprises:
      accessing a list of inbound emails,
      identifying a plurality of sender domains from the list of inbound emails,
      retrieving one or more custom lists from one or more third-party organizations that collect contacts of known individuals or entities, the one or more custom lists comprising the contacts that include one or more email domains, and
      comparing the plurality of sender domains identified from the list of inbound emails to the email domains included in the one or more custom lists, and
      adding one or more sender domains that match the email domains included in the custom list to the whitelist of known domains;
   generating, in response to determining that the sender domain is not in the whitelist of known domains, a message indicating that the email is not valid;
   generating, in response to determining that the sender domain is in the whitelist of known domains, the message indicating that the email is valid; and
   transmitting the message to the requestor.

2. The method of claim 1, wherein the method is performed by a email validation system that is a component of at least one of 1) a third party entity and 2) a receiving email system that receives the email.

3. The method of claim 1, wherein one or more security actions are performed against an email in response to the message indicating the email is not valid, the one or more security actions including at least one of deleting the email, quarantining the email, sending a warning to a recipient of the email, and sending a notification to an administrator.

4. The method of claim 1, wherein the whitelist of known domains is further generated by:
   accessing lists of legitimate domains from one or more third party sources, the one or more third party sources including at least one of domain collection organizations, semi-private data sources, private data sources, and public data sources; and
   cross-referencing the lists of legitimate domains from the one or more third party sources to generate the whitelist of known domains.

5. The method of claim 1, further comprising:
   generating a list of bad domains;
   determining that the sender domain is in the list of bad domains; and
   generating, in response to determining that the sender domain is in the list of bad domains, the response indicating that the email is not valid.

6. The method of claim 1, wherein the whitelist of known domains is further generated by:
   adding one or more sender domains of the plurality of sender domains that are determined to be legitimate sender domains to the whitelist of known domains.

7. The method of claim 6, further comprising determining that a sender domain of the plurality of sender domains is legitimate in response to determining that a threshold number of replies have been made by users to the sender domain.

8. The method of claim 6, further comprising determining that a sender domain of the plurality of sender domains is legitimate in response to determining that replies from a threshold number of different organizations have been made to the sender domain.

9. The method of claim 1, further comprising:
   receiving, from a client device of a user, a list of hashed contacts, the list of hashed contacts including hashes of email addresses hashed using a secret key, the email addresses being from open sign-up domains, an open sign up domain being a domain at which any user can sign up for an email address account, wherein the email addresses are not visible to the email authentication system;
   storing the list of hashed contacts;
   receiving, from the requestor, a second email validation request to validate an email, the second email validation request including a hash of a sender address of the email, and the requestor transmitting the email validation request in response to receiving the email;
   determining whether the hash of the sender address matches a hash of an email address in the list of hashed contacts;
   generating, in response to determining that the sender address is not in the list of hashed contacts, a second message indicating that the email is not valid;
   generating, in response to determining that the sender address is in the list of hashed contacts, the second message indicating that the email is valid; and
   transmitting the second message to the requestor.

10. The method of claim 9, wherein the list of hashed contacts is generated from contact information collected from a contacts manager for one or more users at an organization where the email message was received.

11. The method of claim 9, wherein the list of hashed contacts is generated by:
   normalizing a domain name of an email address in a contacts list of the user to a standard domain name; and
   hashing a local part of the email address with the standard domain name using the secret key to include in the list of hashed contacts.

12. The method of claim 9, wherein the list of hashed contacts only includes hashes of email addresses generated from a contacts manager of one or more users of an organization to which the user belongs.

13. The method of claim 9, wherein the determination of whether the hash of the sender address included in the email validation request matches a hash of an email address in the list of hashed contacts is performed in response to determining that a sender domain for the sender address, which is received in the second email validation request, matches an open-sign up domain.

14. The method of claim 9, wherein the hash of the sender address is matched against a subset of the hashed contacts which is associated with a recipient user that matches an indication of the recipient user received in the second email validation request.

15. The method of claim 1, further comprising:
performing, in response to the determination that the sender domain is not in the whitelist of known domains, a new domain inspection to determine whether to add the sender domain of the sender address to the whitelist of known domains.

16. The method of claim 15, further comprising:
accessing a WHOIS information of the sender domain;
determining whether the WHOIS information includes contact information that can be traced to a real world location; and
adding, in response to a determination that the WHOIS information includes contact information that can be traced to a real world location, the sender domain to the whitelist of known domains.

17. The method of claim 15, further comprising:
accessing a WHOIS information of the sender domain;
determining a duration of time that the registration of the WHOIS information has not been changed; and
adding, in response to a determination that the duration of time exceeds a threshold duration, the sender domain to the whitelist of known domains.

18. The method of claim 15, further comprising:
querying a DNS (Domain Name System) database for the sender domain to determine one or more timestamps of one or more queries by known domains for the sender domain; and
adding the sender domain to the whitelist of known domains, in response to a determination that a duration of time between at least one of the one or more timestamps and a timestamp at which the query was made exceeds a threshold duration.

19. The method of claim 15, further comprising:
querying a DNS (Domain Name System) database for one or more records of the sender domain;
determining a number of records associated with the sender domain; and
adding, in response to a determination that the number of records exceeds a threshold count, the sender domain to the whitelist of known domains.

20. The method of claim 15, further comprising:
querying a DNS (Domain Name System) database for one or more records of the sender domain;
accessing Internet presences associated with the records, wherein an Internet presence is a location on the Internet;
comparing the Internet presences of the sender domain with Internet presences associated with known domains;
adding the sender domain to a list of bad domains within the list of known domains, in response to the comparison indicating that the Internet presences of the sender domain match the Internet presences of one or more known domains in excess of a threshold similarity level.

21. A system, comprising:
a processor; and
memory configured to store computer code comprising instructions, the instructions, when executed by the processor, cause the processor to:
receive an email validation request from a requestor to validate an email, the email validation request indicating at least a sender domain;
determine whether the sender domain is in a whitelist of known domains, wherein a known domain is a domain that is linked to an organization whose provenance is known, such that the known domain can be linked to an identifiable entity in the real world, and wherein the instructions to generate the whitelist of known domains comprises instructions to;
access a list of inbound emails,
identify a plurality of sender domains from the list of inbound emails,
retrieve one or more custom lists from one or more third-party organizations that collect contacts of known individuals or entities, the one or more custom lists comprising the contacts that include one or more email domains, and
compare the plurality of sender domains identified from the list of inbound emails to the email domains included in the one or more custom lists, and
add one or more sender domains that match the email domains included in the custom list to the whitelist of known domains;
generate, in response to determining that the sender domain is not in the whitelist of known domains, a message indicating that the email is not valid;
generate, in response to determining that the sender domain is in the whitelist of known domains, the message indicating that the email is valid; and
transmit the message to the requestor.

22. The system of claim 21, wherein the instructions further cause the processor to:
receive, from a client device of a user, a list of hashed contacts, the list of hashed contacts including hashes of email addresses hashed using a secret key, the email addresses being from open sign-up domains, an open sign up domain being a domain at which any user can sign up for an email address account, wherein the email addresses are not visible to the email authentication system;
store the list of hashed contacts;
receive, from the requestor, a second email validation request to validate an email, the second email validation request including a hash of a sender address of the email, and the requestor transmitting the email validation request in response to receiving the email;
determine whether the hash of the sender address matches a hash of an email address in the list of hashed contacts;
generate, in response to determining that the sender address is not in the list of hashed contacts, a second message indicating that the email is not valid;
generate, in response to determining that the sender address is in the list of hashed contacts, the second message indicating that the email is valid; and
transmit the second message to the requestor.

23. A non-transitory computer readable storage medium, comprising instructions stored thereon, that when executed by a processor, cause the processor to:
receive an email validation request from a requestor to validate an email, the email validation request indicating at least a sender domain;
determine whether the sender domain is in a whitelist of known domains, wherein a known domain is a domain that is linked to an organization whose provenance is known, such that the known domain can be linked to an identifiable entity in the real world, and wherein the instructions to generate the whitelist of known domains comprises instructions to;
access a list of inbound emails,
identify a plurality of sender domains from the list of inbound emails, retrieve one or more custom lists from one or more third-party organizations that collect contacts of known individuals or entities, the one or more custom lists comprising the contacts that include one or more email domains, and compare the plurality of sender domains identified from the list of inbound emails to the email domains included in the one or more custom lists, and add one or more sender domains that match the email domains included in the custom list to the whitelist of known domains;

generate, in response to determining that the sender domain is not in the whitelist of known domains, a message indicating that the email is not valid;

generate, in response to determining that the sender domain is in the whitelist of known domains, the message indicating that the email is valid; and transmit the message to the requestor.

24. The non-transitory computer readable storage medium of claim 23, comprising further instructions stored thereon, that when executed by a processor, cause the processor to:

receive, from a client device of a user, a list of hashed contacts, the list of hashed contacts including hashes of email addresses hashed using a secret key, the email addresses being from open sign-up domains, an open sign up domain being a domain at which any user can sign up for an email address account, wherein the email addresses are not visible to the email authentication system;

store the list of hashed contacts;

receive, from the requestor, a second email validation request to validate an email, the second email validation request including a hash of a sender address of the email, and the requestor transmitting the email validation request in response to receiving the email;

determine whether the hash of the sender address matches a hash of an email address in the list of hashed contacts;

generate, in response to determining that the sender address is not in the list of hashed contacts, a second message indicating that the email is not valid;

generate, in response to determining that the sender address is in the list of hashed contacts, the second message indicating that the email is valid; and transmit the second message to the requestor.

* * * * *